Nov. 1, 1960 J. D. HEIBEL 2,958,100

MOLD FOR FORMING A PLURALITY OF ELECTRICAL ELEMENTS WITH EMBEDDED TERMINALS

Filed May 16, 1955 3 Sheets-Sheet 1

INVENTOR.
Jerome D. Heibel
BY
Ralph Hammar
Attorney

INVENTOR.
Jerome D Heibel
BY
Ralph Hammar
Attorney

INVENTOR.
Jerome D. Heibel
BY Ralph Hammar
Attorney

United States Patent Office 2,958,100

Patented Nov. 1, 1960

2,958,100

MOLD FOR FORMING A PLURALITY OF ELECTRICAL ELEMENTS WITH EMBEDDED TERMINALS

Jerome D. Heibel, Erie, Pa., assignor to Erie Resistor Corporation, Erie, Pa., a corporation of Pennsylvania Filed May 16, 1955, Ser. No. 508,467

2 Claims. (Cl. 18—36)

This invention is intended to make electrical components such as resistors or condensers which are adapted to automatic assembly. In one form, such components have a rectangular body with flat projecting sheet metal terminals in or parallel to the plane of each edge. The components have uniform size and can be easily fed by automatic assembly equipment.

Figure 1:
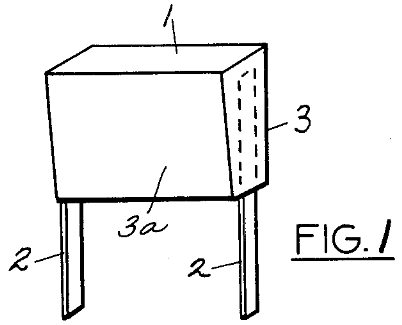
Figure 2:
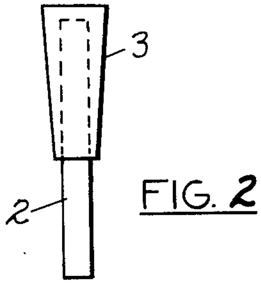
Figure 3:
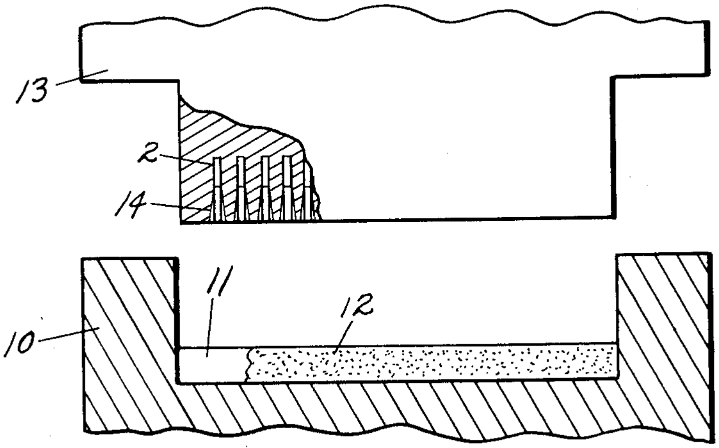
Figure 4:
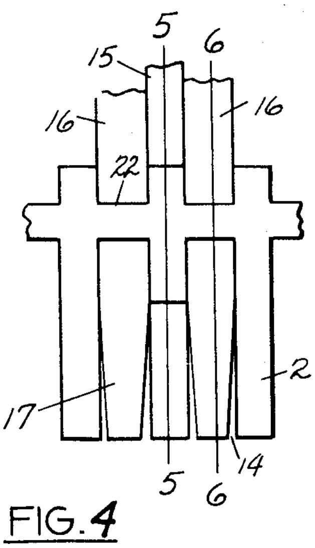
Figure 5:
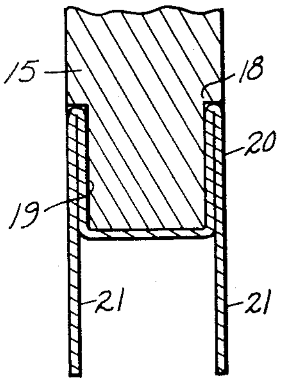
Figure 6:
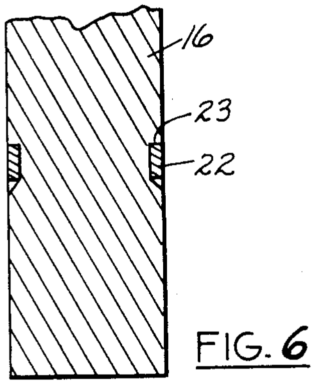
Figure 7:
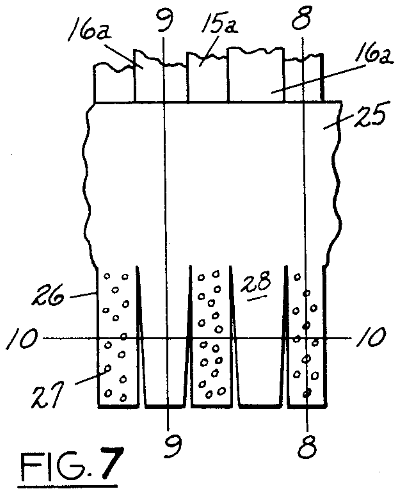
Figure 9:
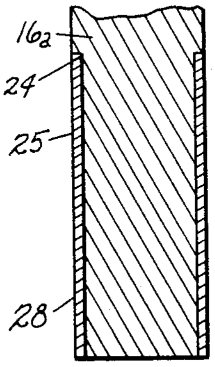
Figure 8:
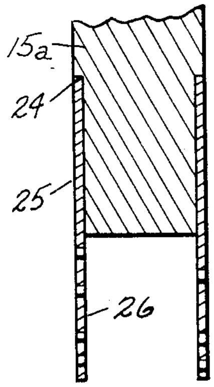
Figure 10:
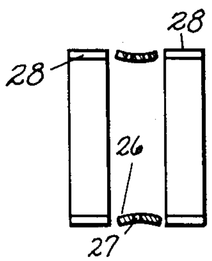
Figure 10A:
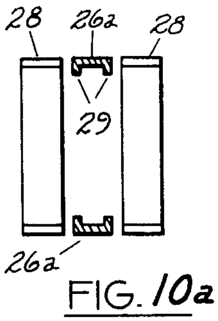
Figure 11:
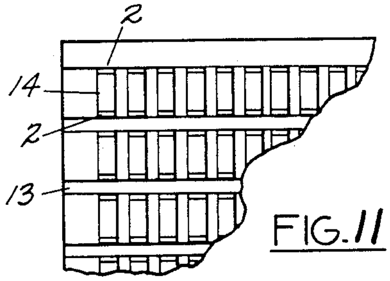
Figure 12:
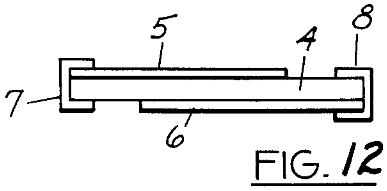
Figure 13:
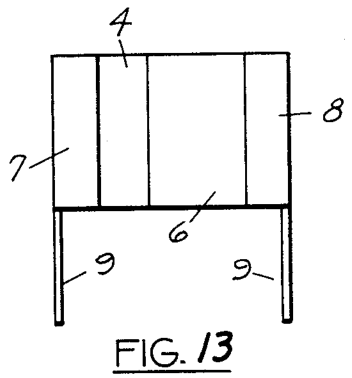
Figure 14:
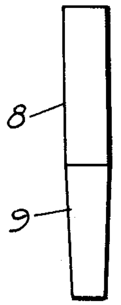
Figure 15:
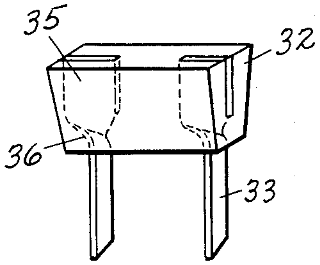
Figure 16:
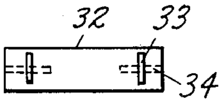
Figure 17:
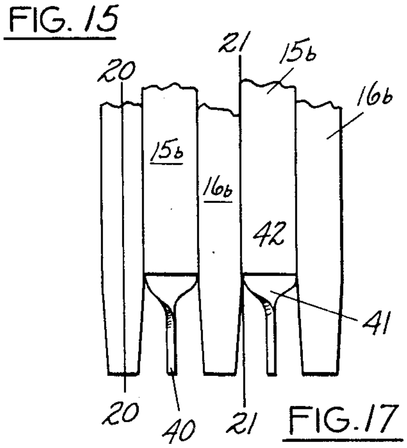
Figure 18:
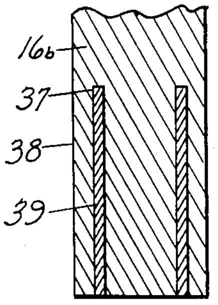
Figure 19:
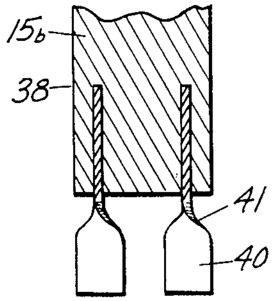

In the accompanying drawing, Fig. 1 is a perspective of a resistor; Fig. 2 is an edge view; Fig. 3 is a section through a multiple cavity mold for making the resistors; Fig. 4 is an enlarged fragmentary view of one part of the mold; Fig. 5 is a section on line 5—5 of Fig. 4; Fig. 6 is a section on line 6—6 of Fig. 4; Fig. 7 is a fragmentary view of one part of another mold; Figs. 8 and 9 are sections on correspondingly numbered lines in Fig. 7; Fig. 10 is a section on line 10—10 of Fig. 7; Fig. 10*a* is a view similar to Fig. 10 of a modification; Fig. 11 is a fragmentary plan of the mold cavities; Fig. 12 is a top view of a condenser; Fig. 13 is a front view of the condenser; Fig. 14 is an edge view of the condenser; Fig. 15 is a perspective of a resistor with another form of terminal; Fig. 16 is a bottom view of the Fig. 15 resistor; Fig. 17 is a fragmentary view of one part of a mold for making the Fig. 15 resistor and Figs. 18 and 19 are sections on the corresponding lines of Fig. 17.

The resistor shown in Figs. 1 and 2 has a generally rectangular body 1 of molded resistance material with projecting sheet metal terminals 2 in substantially direct continuation of the edges 3 of the body. From one aspect the body has diverging rectangular faces **3*a* which result in the edges 3** being of trapezoidal section. There is a slight taper in the thickness of the body which provides the draft for easy ejection of the resistors from the mold cavity.

The condenser shown in Figs. 12, 13 and 14 has a substantially rectangular body 4 of dielectric material having electrode coatings 5 and 6 on opposite faces. At one edge there is a channel-shaped terminal 7 overlapping the edge and soldered to the electrode 5. At the opposite edge there is a channel-shaped terminal 8 overlapping the opposite edge and soldered to the electrode 6. Both of the terminals 7 and 8 have terminal projections 9 which are substantially direct continuations of the edges of the dielectric 4.

The resistor shown in Figs. 15 and 16 has a rectangular body 32 of resistance material at opposite ends of which are sheet metal leads or terminals which have projecting ends 33 parallel to the edges 34 of the body and embedded portions 35 perpendicular to the edges of the body and extending inward therefrom at the center of the body. The portions 33 and 35 are connected by a twisted section 36 which is embedded in the body and assists in anchoring the terminals.

The resistor of Figs. 1, 2 and 15, 16, and the condenser of Figs. 12, 13 and 14 may be enclosed in insulating cases either by dipping in an insulating compound or by molding an insulating case around the bodies of the components. Both components are adapted to automatic assembly because the projecting terminals 2 or 9 as the case may be are accurately spaced with respect to the bodies of the components. Also, the components have uniform body size of a shape which is well adapted to feeding consecutively down a chute either end to end, side by side, or edge to edge, thus giving the machine designer wide choice of methods to suit different conditions or packaging methods.

In the mold for making the resistors, there is a lower platen 10 having one or more rectangular cavities 11 in which molding powder 12 may be easily loaded. The upper platen 13 has one or more rows of cavities 14, each row corresponding to one of the cavities 11 and each individual cavity 14 having terminals 2 at opposite edges. The individual cavities 14 are of the same shape as the body 3 and are tapered so that the molded resis tors can be easily ejected from the cavities. Fig. 11 diagrammatically shows how the cavities are arranged in rows. As the upper platen 13 descends, the heat plasticizes the resistance molding composition 12 and when it reaches the plastic state, it readily flows up into the cavities 14 completely filling the cavities. It will be noted that the cavities are very closely spaced together because the system is in hydraulic balance and there is no need for thick walls between adjacent cavities. This permits the molding of a large number of resistors in a single molding operation.

This construction also eliminates the need for sprues for feeding the resistance composition into the narrow deep cavities.

In Figs. 4, 5 and 6 is shown a terminal construction in which all of the terminals for one of the rows of cavities in the platen 13 are connected together in a single strip so that the terminals can be loaded into the upper platen as a unit. In this construction, at the bottom of each cavity 14 is a punch or ejector pin 15 which closes the bottom of the cavity and is reciprocable relative to the upper platen 13. On each side of each punch 15 is a punch 16. The punches 16 have tapered ends 17 which cooperate to provide the mold cavities 14 molding the bodies 3 of resistance material. The lower ends of the punches 15 are notched at 18 to receive a U-shaped piece 19 connecting the terminals 2 at opposite edges of the punch 15. The U-shaped piece 19 in conjunction with the upper end 20 of the terminals 2 closes the small end of the mold cavity. After the molding operation, the U-shaped piece 19 is removed and the upper ends 20 which project outside the mold cavity become the projecting portion 2 of the terminals. The lower ends 21 of the terminals project into the mold cavity 11 adjacent the sides thereof and are molded to the resistance material during the molding operation. Between adjacent portions 20 of the terminals 2 are connecting pieces 22 which fit in notches 23 of the punches 16.

In Figs. 7 to 10, inclusive, the same mold construction is modified so as to permit the use of separate strips of terminals for each side of the mold cavities. In this mold, the punches **15*a* and 16*a* which correspond to the punches 15 and 16 have recesses 24 in opposite edges of depth sufficient to receive strips 25 which provide the resistor terminals. The upper ends of the strips 25 are plane and occupy the entire depth of the recesses 24. At the lower end, strips 25 have perforated projections 26 which provide the parts of the terminals 2 embedded in the plastic resistance composition. As is more clearly shown in Fig. 10, the perforated portions 26 are concave inward toward the center of the body of resistance material so that resistance material can actually flow through the perforations 27 and mechanically lock as well as electrically connect the perforated portions to the resistance material. Opposite the edges of the punches 16a, the strips have portions 28 which have the same shape as the punches. The portions 28 are filler pieces which provide a seal between the edges of the punches 16a and the mold cavity. With the Figs. 7 to 10 mold construction, the terminals for one edge of each resistor form part of a single strip 25 so that when two of the strips 25** are loaded into the mold each of the resistors in that row are provided with terminals.

In Fig. 10*a* is shown a modification in which the portions 26a of the strip 25 which are to be embedded in the edges of the resistor are made of channel-shape with the channels facing each other so that the edges 29 are embedded in the resistance material during the molding operation. Channel-shape of Fig. 10*a* is another way of securing adequate mechanical bonding and electrical connection to the resistance material.

The mold constructions so far described may be used for applying the insulating cases to capacitors such as shown in Figs. 12 to 14, inclusive. When used for this purpose, the terminals in the strips are first soldered to the necessary electrodes 5 and 6 and the strips with the condensers connected thereto are loaded into the mold cavities in the upper platen 13. When the upper platen moves downward, the plastic insulating material in the lower cavity 11 plasticizes and is forced up into the cavities 14 around the capacitors. Also, the strip of molded resistors may have a plastic case applied around each individual resistor after molding by loading strips of molded resistors into similar dies.

Figs. 17, 18 and 19 show a modification of the mold construction for molding the resistors of Figs. 15 and 16. In this construction, the punches 15b and 16b which correspond to the punches 15 and 16 have slots 37 spaced inward from and parallel to the edges 38 of the punches. The slots 37 receive the upper edges of sheet metal strips 39 from which the projecting terminal portions 33 are to be formed by a stamping operation. In the punches 16b, the strips fill the full depth of the slots 37. Below the lower ends of the punches 15b, the strip 39 has spaced portions 40 connected to the strip by twisted sections 41. The portions 40 extend parallel to and midway between the sides 42 of the punches 15b and form the embedded portions 35 of the Fig. 15 resistor. The twisted sections which likewise project below the punches 15b form the embedded portions 36 of the Fig. 15 resistor. As in the other molds, the lower ends of the punches 16b are tapered so the cavities have a generally trapezoidal shape. When the molded resistors are removed from the mold, they are joined to the strips 39 and are separated by cutting the metal opposite the edges 38 of the punches 16b.

In all forms of the invention, the circuit component has a thin rectangular body with diverging rectangular faces so the edges are of trapezoidal cross-section and the terminals project from the narrow ends of the trapezoidal edges in substantially direct continuation thereof. The body may be an insulating case for a resistor or a capacitor embedded therein or, in the case of resistors, it may be the resistance material. By having the cavities side by side and extending endwise into a punch, a large number of components may be molded in a single press. No sprues are needed because the open ends of the cavities engage the molding composition and as soon as the composition reaches the plastic or flowable stage it readily flows into the open ends of the cavities. The cavities can be closely spaced because the system is in hydraulic balance.

What is claimed as new is:

1. A die for molding electric circuit components having thin rectangular bodies comprising a row of punches, said row having adjacent pairs which have opposed outer end faces of rectangular shape spaced apart the thickness of the body to be molded, and intermediate punches between and in contact with the punches of said adjacent pairs terminating short of the outer ends of the adjacent pairs and cooperating therewith to provide open ended rectangular honeycomblike cavities between said adjacent pairs of punches, and a cavity complementary to said row of punches but not to the individual punches for receiving molding composition to be forced into said open ended cavities as the row of punches is pressed into said complementary cavity.

2. A die for molding electric circuit components having thin rectangular bodies comprising a row of punches, said row having adjacent pairs which have opposed outer end faces of rectangular shape spaced apart the thickness of the body to be molded, and intermediate punches between and in contact with the punches of said adjacent pairs terminating short of the outer ends of the adjacent pairs and cooperating therewith to provide open ended rectangular cavities between said adjacent pairs of punches, said row of punches having recesses in opposite edges for receiving a strip of sheet metal terminals, said strip having portions projecting into said cavities and other portions engaging said intermediate punches and projecting beyond the closed end of said cavities, said strip when loaded being within the confines of the row of punches and a cavity complementary to said row of punches but not to the individual punches for receiving molding composition to be forced into said open ended cavities as the row of punches is pressed into said complementary cavity.

References Cited in the file of this patent

UNITED STATES PATENTS

| | | |
|---|---|---|
| 461,721 | Thurfelder | Oct. 20, 1891 |
| 1,815,721 | McGraw | July 21, 1931 |
| 1,847,888 | Nickle | Mar. 1, 1932 |
| 1,856,723 | Phelps | May 3, 1932 |
| 1,972,411 | Swartz et al. | Sept. 4, 1934 |
| 1,983,267 | Browne et al. | Dec. 4, 1934 |
| 2,203,996 | Megow et al. | June 11, 1940 |
| 2,216,863 | Visman | Oct. 8, 1940 |
| 2,218,669 | Whipple | Oct. 22, 1940 |
| 2,281,130 | Woodruff | Apr. 28, 1942 |
| 2,282,328 | Herrick et al. | May 12, 1942 |
| 2,305,977 | Megow et al. | Dec. 22, 1942 |
| 2,454,508 | Herrick et al. | Nov. 23, 1948 |
| 2,485,421 | Timpe | Oct. 18, 1949 |
| 2,511,079 | Robb | June 13, 1950 |
| 2,609,470 | Quinn | Sept. 2, 1952 |

OTHER REFERENCES

Application of Heibel, Ser. No. 566,253, filed February 17, 1956.